United States Patent [19]
Jaffee

[11] Patent Number: 6,008,147
[45] Date of Patent: Dec. 28, 1999

[54] FIBER GLASS MAT FOR LAMINATING TO FOAM, FOAM LAMINATE PRECURSOR, FOAM LAMINATE, AND METHODS OF MAKING THE MAT AND THE FOAM LAMINATE

[75] Inventor: Alan Michael Jaffee, Bowling Green, Ohio

[73] Assignee: Johns Manville International, Inc., Denver, Colo.

[21] Appl. No.: 09/086,161

[22] Filed: May 28, 1998

[51] Int. Cl.$^6$ .............................. B32B 17/04; D04H 1/58
[52] U.S. Cl. ..................... 442/331; 442/149; 442/180; 442/348; 156/212
[58] Field of Search .................................. 442/180, 331, 442/348, 149, 150, 173; 156/196, 212

[56] References Cited

U.S. PATENT DOCUMENTS

| | | | |
|---|---|---|---|
| 4,729,917 | 3/1988 | Symdra et al. | 442/370 X |
| 4,879,173 | 11/1989 | Randall | 442/180 X |
| 5,342,680 | 8/1994 | Randall | 442/180 X |
| 5,393,379 | 2/1995 | Parrinello | 162/101 |
| 5,403,654 | 4/1995 | Muto et al. | 442/180 X |
| 5,565,049 | 10/1996 | Simmons et al. | 156/62.6 |
| 5,772,846 | 6/1998 | Jaffee | 442/180 X |
| 5,851,933 | 12/1998 | Swartz et al. | 442/180 |

FOREIGN PATENT DOCUMENTS

WO 98/11299  9/1997  WIPO .

*Primary Examiner*—Daniel Zirker
*Attorney, Agent, or Firm*—Robert D. Touslee

[57] ABSTRACT

A fiber glass mat especially useful for bonding to foam contains glass fibers and a "B" staged acrylic resin having a glass transition temperature above 45 degrees C., the method of making the mat, a precursor for a foam laminate, a method for making a foam laminate, and the product produced by the latter method are disclosed. The mat conforms well to any curvature on the foam layer and stiffens the foam layer resulting in a superior foam laminate for making automotive parts like headliners.

11 Claims, No Drawings

FIBER GLASS MAT FOR LAMINATING TO FOAM, FOAM LAMINATE PRECURSOR, FOAM LAMINATE, AND METHODS OF MAKING THE MAT AND THE FOAM LAMINATE

The present invention involves mats having particular use in bonding to foam to stiffen the foam to use in making automotive parts such as headliners or topliners, foam laminate precursors, foam laminates and methods of making mat and foam laminates. The mats produced according to this invention are useful as reinforcement and dimensional stabilizers for making a large number of polymeric foam laminate products.

BACKGROUND

It is known to use nonwoven fiber, such as glass fiber, mats bonded with a thermosetting resin, like urea formaldehyde, to laminate to polymeric foam such as polystyrene foam to act as stiffeners and stabilizers in the manufacture of automotive parts such as automobile head liners as disclosed in U.S. Pat. No. 4,729,917. Products produced with foam laminates having one or two layers of nonwoven fiber glass mat with urea formaldehyde binder are affected by high humidity and high ambient temperature to cause an unpleasant odor and also to deteriorate the binder strength. Also, non-extendible mat, i. e. a mat bound with a resin binder that is fully cured is relatively stiff and does not conform well to curves and complex curvature, such as three dimensional curvature, and still provide excellent rigidity or stiffness to the foam laminate.

It is also known to make nonwoven fiber glass mats for bonding to a layer of polymeric foam to stiffen the foam by chopping dry strands of glass fibers bound together with a binder to form chopped strand, to collect the chopped strand on a moving conveyor in a random pattern, and to bond the chopped strand together at their crossings by dusting a dry, powdered thermoplastic binder like a polyamide, polyester or ethylene vinyl acetate on wetted chopped strands followed by drying and curing the binder, as disclosed in U.S. Pat. No. 5,565,049. While such products may work, the mat does not have as high a tensile strength as desired and as achieved with a wet laid nonwoven fiber glass mat because the bundles or chopped strands in the mat, according to the disclosure of the above cited patent, do not bond together as well as the individual fibers in a typical nonwoven mat. For example, the average sum of the machine direction tensile and the cross machine direction tensile for a chopped fiber glass strand mat made in this manner and having a basis weight of about 1.88 pounds per 100 sq. ft. is about 24 lbs. per 3 inch width compared to at least twice this tensile for wet laid nonwoven fiber glass mats. Mats made according to the process of U.S. Pat. No. 5,565,049 also are more expensive to make than a typical nonwoven mat made with known wet laid processes.

It is also known to use an acrylic copolymer latex, such as a self-crosslinking acrylic copolymer of an anionic emulsifying type as one component of at least a two component binder for bonding glass fibers and particulate thermoplastic to make a glass fiber reinforced sheet that can later be hot molded into various shapes and articles, as disclosed in U.S. Pat. No. 5,393,379. The sheet products taught by this patent would not be suitable to use for stiffening foam layers because of the presence of the substantial amount of particulate thermoplastic in the sheet.

SUMMARY OF THE INVENTION

The present invention includes a fibrous nonwoven mat for laminating to a material like a polymeric foam layer, comprising dispersed and crossing glass fibers bound together with a "B" staged acrylic copolymer latex, the acrylic copolymer having a glass transition temperature exceeding 45 degrees centigrade, and preferably near 55 degrees C. By near is meant +/−1–5 degree C., such as +/−2 degrees C. The glass transition temperature can be as high as at least 72 degrees C. Phenol formaldehyde resins that are "B" stagable can also be used, but are not as desirable because of their tendency to give off an unpleasant odor in high humidity, high ambient temperature environments. The invention also includes polymeric foam laminate precursors and laminates having a wet laid, nonwoven mat, according to the present invention, adhered or laminated to at least one major surface, and preferably both major surfaces, of a polymeric foam.

The invention also includes a method of making the nonwoven mat described above comprising dispersing glass fibers in an aqueous slurry, collecting the dispersed fibers onto a moving permeable support to form a fibrous nonwoven, removing excess water from the fibrous nonwoven, applying an aqueous acrylic copolymer latex, the acrylic copolymer having a glass transition temperature exceeding 45 degrees C., removing excess latex, and drying and curing the mat to only "B" stage the acrylic copolymer. The present invention also includes a precursor to a foam laminate, a method of making foam laminates by adhering a mat, according to the present invention, onto at least one surface of a polymeric foam part or layer. and molding the precursor sandwich into a finished foam laminate or composite, and the finished foam laminate.

The mats of the present invention preferably have bundles of incompletely dispersed fibers in which the fibers are preferably at least 1.1 inch long and most preferably at least 1.25 inch. The mats can also contain pigments, dyes, flame retardants, and other additives so long as they do not significantly reduce the ability of the mat to bond to a foam surface. The pigments or other additives can be included in the fiber slurry, the binder slurry or can be sprayed or otherwise coated onto the mat later using known techniques.

DETAILED DESCRIPTION OF THE INVENTION

It is known to make reinforcing nonwoven mats from glass fibers and to use these mats as substrates in the manufacture of a large number of roofing and other products. Any known method of making nonwoven mats can be used, such as the conventional wet laid processes described in U.S. Pat. Nos. 4,129,674, 4,112,174, 4,681,802, 4,810, 576, and 5,484,653, the disclosures of each being hereby incorporated herein by reference for the purpose of describing mat production. In such processes a slurry of glass fiber is made by adding glass fiber to a typical white water in a pulper to disperse the fiber in the white water forming a slurry having a fiber concentration of about 0.2–1.0 weight %, metering the slurry into a flow of white water to dilute the fiber concentration to 0.1 or below, and depositing this mixture onto a moving screen forming wire to dewater and form a wet nonwoven fibrous mat.

The preferred technique for the making of mats of the present invention is forming a dilute aqueous slurry of fibers and depositing the slurry onto an inclined moving screen forming wire to dewater the slurry and form a wet nonwoven fibrous mat, on machines like a Hydroformerm manufactured by Voith—Sulzer of Appleton, Wis., or a Deltaformer™ manufactured by North County Engineers of Glenns Falls, N.Y.

This wet nonwoven mat of glass fiber is then transferred to a second moving screen and passed through a binder application saturating station where an aqueous binder is applied to the mat in any one of several known ways. The binder saturated mat is then passed over a suction section while still on the moving screen to remove excess binder.

The wet mat is then transferred to a wire mesh moving belt and passed through an oven to dry the wet mat and to cure (polymerize) the polymeric binder based resin binder which bonds the fibers together in the mat. Preferably, the aqueous binder solution is applied using a curtain coater or a dip and squeeze applicator, but other known methods of application such as spraying will also work. Alternative forming methods for making the mat include the use of well known paper or board making processes such as cylinder forming, etc. or "dry laying" using carding or random fiber distribution.

When making mat of the present invention, the temperatures and time in the drying and curing oven are controlled to only "B" stage the acrylic copolymer binder, being careful not to fully cure the binder. This is critical to the performance of the mat. When the mat binder is cured to only "B" stage, the mat is softer and more flexible and molds better, particularly to a curved or complex curvature shape. Also, a substantially stiffer foam laminate results when the binder in a wet laid, nonwoven mat molded with an adhesive coated foam layer is only cured to "B" stage than if the binder is fully cured prior to molding. In the latter case the foam laminate is either not well formed or is not stiff enough for automotive headliner applications whereas it is at least equal in stiffness and superior in shape or mat conformity when the mat of this invention is used.

Mats of the present invention preferably contain about 70–85 weight percent fibers and about 15–30 percent acrylic copolymer binder. Up to about 50 weight percent binder is permissible, but up to about 30 percent is generally preferred. However, in some instances, higher binder contents improve stiffness of the final composite or laminate as will be seen below. The preferred basis weight of the mat will depend upon the specific application. For stiffening foam for automotive headliners, the preferred basis weight is about 1.6 pounds per 100 square feet, but a basis weight of 1.9 lbs./100 sq. ft. also worked well and weights lighter than 1.6 lbs./100 sq. ft. also are suitable.

The majority of the fibers are glass fibers and preferably all the fibers are glass fibers. The glass fibers should be at least 0.75 inch long or longer, more preferably at least one inch long and most preferably at least 1.1, e. g. 1.25 to 1.5 inches long. The glass fibers which can be used to make mats can have various fiber diameters dependent on the strength and other properties desired in the mat as is well known, but since the mat is intended to be relatively stiff, fibers having a diameter of at least 13 microns are preferred and at least 15 micron is more preferred, such as M fiber which has an average fiber diameter of about 15.5–16.5 microns. It is preferred that the fibers be coated with a silane containing size composition which is well known in the industry.

It is preferred that the length of the chopped strands of glass fiber be such that when the chopped strand is added to the wet mat machine in the stock preparation section the fiber does not completely disperse, leaving some multi-fiber bundles in the stock. These bundles, much smaller in numbers of fibers than the chopped strand used in the prior art as discussed earlier, are beneficial to the stiffness of the present mat product and its stiffening performance when laminated to foam. This is accomplished in normal whitewater with a fiber length of at least 1.1 inch and most preferably at least 1.25 inch. This can also be accomplished with shorter fiber by modifying the whitewater in known ways to reduce dispersion effectiveness, reducing agitation and/or time in the pulper and the stock tank or a combination of these.

The glass fibers can be E, C, T, S or any known type glass fiber of good strength and durability in the presence of moisture and mixtures of lengths and diameters. The preferred fibers are K or M 137 and K or M 117 E glass fibers available from Johns Manville International, Inc. of Denver, Colo., but many commercially wet chop glass fiber product will be suitable. While the majority of the fibers are glass fibers, a minor portion of non-glass fibers can also be used, such as man made or natural organic fibers like Nylons™, polyester, polyethylene, polypropylene, cellulose or cellulose derivatives, etc.

The binders used to bond the fibers together are cross linking acrylic copolymer resins that can be put into aqueous solution or emulsion latex, have a glass transition temperature (GTT) of at least 45 degrees centigrade and that can be "B" staged. To "B" stage these resins in the present invention, very little, or preferably no, external cure catalyst is used and the mat is cured at temperatures between about 220 and about 300 degrees F., preferably about 250 degrees F. for very short times, such as 40 seconds or less, preferably about 10–20 seconds. If the cure temperature is much less than 220 degrees F., the resultant mat will not have adequate strength for handling and processing in the intended uses to avoid damage. If the cure temperature is much above 300 degrees F., the resin will cure too much and the mat will not bond as well to foam later. Preferably, GTT is between 50 and 72 and most preferably about 55 +/−5 degree C such as 55 +/−2 degrees C.

The preferred crosslinking acrylic copolymer for use as a binder in the present invention is an aqueous carboxyl modified acrylic copolymer known as Hycar™ 26315 available from the BF Goodrich Company of Brecksville, Ohio, and having a glass transition temperature of about 55 degrees C. This same company's Carbocure™ TSR-72, having a glass transition temperature of 72 degrees C. works almost as well, but the mat made using this binder may be too stiff for some applications. In the present invention, these binders can be used in amounts of up to about 50 weight percent of the mat, but preferably make up no more than 30 wt. percent of the mat.

Preferably, the aqueous binder solution is applied using a curtain coater or a dip and squeeze applicator. In the drying and curing oven the mat is heated to temperatures of up to about 300 degrees F., but this can vary from about 220 degrees F. to as high as about 300 degrees F., for periods usually not exceeding 1 or 2 minutes and frequently less than 40 seconds.

EXAMPLE 1

A fiber slurry was prepared in a well known manner by adding 1.25 inch long wet M 137 E type glass wet chopped fiber from Johns Manville International, Inc. having a silane containing chemical sizing on the surface, as is well known, to a known cationic white water containing Natrosol™ thickening agent available from Aqualon, Inc. of Wilmington, Del., and a cationic surfactant C-61, an ethoxylated tallow amine available from Cytec Industries, Inc. of Morristown, N.J., as a dispersing agent to form a fiber concentration of about 0.8 weight percent. After allowing the slurry to agitate for about 20 minutes to thoroughly disperse the fibers, the slurry was metered into a moving stream of the same whitewater to dilute the fiber concentration to a concentration averaging about 0.05 to 0.06 weight percent before pumping the diluted slurry to a headbox of a Voith Hydroforme™ where a wet nonwoven mat was continuously formed.

The wet mat was removed from the forming wire and transferred to a Sandy Hill Curtain Coater where an aqueous acrylic copolymer latex, Hycar™ 26315 was applied in an amount to provide a binder level in the cured mat of about 20–30 weight percent. The wet mat was then transferred to an oven belt and carried through an oven to dry the mat and to heat the mat to a temperature of about 250 degrees F. for about 30 seconds to "B" stage the resin binder. The basis weight of the mat produced was about 1.6 lbs./100 sq. ft. The mat had the following properties:

| | |
|---|---|
| Hot Wet Tensile (10 minutes in 180 degree F. water) | 90+ percent |
| Thickness | 23 mils |
| Loss On Ignition | 21 wt. percent |
| Machine Direction Tensile | 30 lbs./3 inch wide sample |
| Cross Machine Direction Tensile | 25 lbs./3 inch wide |

After further curing the above mat further at 375 degrees F. for 3 minutes the mat was tested for tensile strength with the following results:

| | |
|---|---|
| MD tensile | 64 lbs. per 3 inch wide sample |
| CMD tensile | 45 lbs. Per 3 inch wide sample |
| Hot wet tensile — No change. | |

The higher tensiles of the post cured mat show that further curing of the binder to fully cure the binder increases its tensile strength.

This mat was then laminated to foam in the following manner: The foam was a layer of urethane foam having a density of about 2.1 lbs. per cubic feet purchased from Foamex of Ft. Wayne, Ind. This foam layer was coated on both major sides with B. F. Goodrich Sancure™ 815, an alphatic waterborne urethane polymer adhesive, at a rate of 30–35 grams/square meter and a sheet of mat of Example 1 was put on the adhesive layer on each side of the foam layer. This particular adhesive is only one of many heat settable adhesives that is suitable for the present invention. This sandwich was then molded at about 320 degrees F. and just enough pressure to deform the sandwich into the shape of the hot mold, and allowed to set under pressure and temperature for one minute. The resultant molded composite or laminate, laminate A in the TABLE below, had a stiffness much higher than the foam layer itself and approximately equal to the stiffness of a chopped strand mat, foam layer, chopped strand mat composite molded in the same manner as above.

EXAMPLE 2

Another mat was made in exactly the same way as in Example 1, except that the binder for the mat was replaced with B. F. Goodrich Company's Carbocure™ TSR - 72 acrylic copolymer having a glass transition temperature of about 72 degrees C. The properties of the mat after curing the binder to "B" stage only were:

| | |
|---|---|
| Thickness | 23 mils |

| | |
|---|---|
| Hot wet tensile | 5 percent |
| Loss On Ignition | 26.8 weight percent |
| Machine Direction Tensile | 52 lbs./3 inch sample |
| Cross Machine Tensile | 49 lbs./3 inch sample |

Samples of this mat were further treated by heating them to 375 degrees F. for 3 minutes and tested for tensile with the following results:

| | |
|---|---|
| Hot wet tensile | 73 percent |
| Machine direction tensile | 116 lbs./3 inch wide sample |
| Cross machine dir. tensile | 95 lbs./3 inch wide sample |

The mat made in Example 2 above was used to make a laminated foam sandwich in the same manner as described in Example 1, referred to in the TABLE below as laminate B, with similar results as achieved in Example 1.

Examples 3–5

Mats were made exactly as described in Example 1, except for the amount of binder used in the mat and the basis weight of the mat. The properties of theses mats follow (the tensile strengths are in the same units and tested the same as Examples 1 and 2):

| Example No. | % Binder | Basis wt.* | MD Tensile | CMD Tensile |
|---|---|---|---|---|
| Example 3 | 21 | 1.76 | 28 | 27 |
| Example 4 | 33 | 1.98 | 60 | 54 |
| Example 5 | 15 | 1.23 | 27 | 27 |

*lbs. per 100 sq. feet

Laminates were made with the mats of Examples 3–5 exactly as described in Example 1 and tested to failure in a three point loading test known as S. A. E. J949A standard, of different foam laminates made the very same way except for the type of mat used. Laminate C is a foam laminate using the mat from Example 3, laminate D was made using the mat from Example 4, laminate E was made using the Mat from Example 5. The loading test results of the laminates made in the above Examples are shown in the TABLE below:

TABLE

| | A | B | C | D | E |
|---|---|---|---|---|---|
| Average peak load at failure (Newtons) | 14.6 | 13.9 | 17.8 | 19.5 | 13.6 |

Other conventional wet laid nonwoven mats, such as DURA-GLASS™ 3115, 8130, M8130 and 8422 were evaluated as mats to use to laminate to foam layers using the laminating process described in Example 1 to achieve a laminate or composite of the desired stiffness, but none of these mats produced a laminate with as high a stiffness as those of the present invention, and not high enough stiffness to meet the requirements for use in automotive headliners. For example, M8130 mat produced an average peak load of only 10 Newtons and 3015 mat produced an average peak load of only 5 Newtons.

The higher tensiles of the "B" staged wet laid nonwoven mat of the present invention, compared to the currently used chopped strand mat disclosed in U.S. Pat. No. 5,565,049, makes it easier to work with and apply the nonwoven mat to the foam layer and reduces tears in the mat during molding. The higher tensiles of the fully cured wet laid nonwoven mats of the present invention, compared with the molded chopped strand mat described above, makes the molded foam laminate or composite tougher and more durable.

Other adhesives than the adhesive described in the Examples above can be used to help bond the fiber mat to the foam layer. For example, an ethylene vinyl acetate having a softening range of 230–250 degrees F. can be used as well as many others, so long as the adhesive sets or fully cures under heat and pressure in a reasonable time. Other adhesives for this purpose are well known and it is within the skill of an artisan to select suitable adhesives for this purpose.

While the preferred embodiments of the invention have been disclosed in detail, other embodiments within the described invention and having other functional additives known or obvious to those skilled in the art are considered to be part of the present invention and are intended to be included in the invention claimed below.

I claim:

1. A fiber glass wet laid nonwoven mat comprising crossing glass fibers as a major portion bonded together with up to about 50 weight percent, based on the weight of said mat, of a crosslinking acrylic copolymer latex resin binder having a glass transition temperature in the range of 50 degrees C. up to 60 degrees C. and wherein the resin binder is only partially cured to a "B" stage condition.

2. A mat as described in claim 1 wherein the major portion of the mat is glass fibers having a length of 1.1 inch or longer, wherein the mat contains bundles of undispgrsed fibers and wherein the mat contains about 15 to about 30 weight percent of said binder.

3. A mat as described in claim 1 wherein the fibers contain man made or natural organic fibers.

4. A mat as described in claim 2 wherein the fibers comprise at least 70 weight percent of the mat.

5. A mat as described in claim 1 wherein the fibers comprise at least 70 weight percent of the mat and the binder comprises a carboxyl modified acrylic copolymer.

6. A method of making a fiber glass mat for bonding to a layer of foam to make an automotive part wherein an aqueous mixture comprising a binder is applied to a wet laid nonwoven mat of unbonded, crossing glass fibers followed by drying said mat and at least partially curing said resin to form a bonded glass fiber mat, the improvement comprising using as the resin binder a crosslinking acrylic copolymer having a glass transition temperature of 50 degrees C. and up to about 60 degrees C., drying and curing the mat only partially to "B" stage the resin binder, said binder being present in the dried mat in amounts up to about 50 weight percent of the mat.

7. The method of claim 6 wherein the major portion of the mat is glass fibers having a length of 1.1 inch or longer such that bundles of said fibers do not fully disperse in a process used to form said mat and the binder content of the mat is in the range of about 15 to about 30 weight percent.

8. The method described in claim 7 wherein the crossing unbonded fibers also contain man made or natural organic fibers.

9. The method of claim 7 wherein the mat is heated to temperatures below about 300 degrees F. for a time that will convert and keep said binder to and in a "B" stage condition.

10. The method as described in claim 6 wherein the fiber content of the mat is controlled to be at least 70 weight percent of the mat.

11. The method as described in claim 7 wherein the fiber content of the mat is controlled to be at least 70 weight percent of the mat and said binder comprises a carboxyl modified acrylic copolymer.

* * * * *